United States Patent
Wilson (10) Patent No.: US 9,454,943 B2
(45) Date of Patent: Sep. 27, 2016

(54) COMPUTING SYSTEMS AND METHODS FOR CONTROLLING A COMPUTING SYSTEM

(71) Applicant: Razer (Asia-Pacific) Pte. Ltd., Singapore (SG)

(72) Inventor: John Alexander Wilson, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 14/436,165

(22) PCT Filed: Oct. 16, 2012

(86) PCT No.: PCT/US2012/060325
§ 371 (c)(1),
(2) Date: Apr. 16, 2015

(87) PCT Pub. No.: WO2014/062157
PCT Pub. Date: Apr. 24, 2014

(65) Prior Publication Data
US 2015/0228244 A1    Aug. 13, 2015

(51) Int. Cl.
*G09G 5/00* (2006.01)
*H04N 7/01* (2006.01)
*G06F 1/32* (2006.01)

(52) U.S. Cl.
CPC ............... *G09G 5/00* (2013.01); *G06F 1/324* (2013.01); *G06F 1/3265* (2013.01); *H04N 7/0127* (2013.01); *G09G 2330/021* (2013.01); *G09G 2340/0435* (2013.01); *Y02B 60/1217* (2013.01); *Y02B 60/1242* (2013.01)

(58) Field of Classification Search
CPC ........... G09G 2340/0435; G09G 5/00; G09G 2330/021; H04N 7/0127; G06F 1/324; G06F 1/3265; Y02B 60/1217; Y02B 60/1242
See application file for complete search history.

(56) References Cited

U.S. PATENT DOCUMENTS

| 5,991,883 | A | 11/1999 | Atkinson |
| 8,249,819 | B1 | 8/2012 | Treichler et al. |
| 8,334,857 | B1* | 12/2012 | Ogrinc .................. G09G 5/377 345/204 |
| 2005/0223249 | A1 | 10/2005 | Samson |
| 2006/0146056 | A1* | 7/2006 | Wyatt .................. G09G 5/006 345/501 |

(Continued)

FOREIGN PATENT DOCUMENTS

| CN | 1338067 A | 2/2002 |
| CN | 1394308 A | 1/2003 |

(Continued)

OTHER PUBLICATIONS

First Office Action issued Feb. 6, 2016, for Chinese Patent Application No. 201280077746.1.

(Continued)

*Primary Examiner* — Priyank Shah
(74) *Attorney, Agent, or Firm* — Polsinelli PC (57) ABSTRACT

According to various embodiments, a computing system may be provided. The computing system may include: a circuit configured to operate at a plurality of operation frequencies; a graphics output configured to output image data for display; a rate determiner configured to determine a frame rate of the graphics output; and a frequency setter configured to set an operation frequency of the circuit based on the determined frame rate.

2 Claims, 5 Drawing Sheets

(56) References Cited

U.S. PATENT DOCUMENTS

| | | | |
|---|---|---|---|
| 2008/0088464 A1 | 4/2008 | Gutierrez | |
| 2008/0100598 A1 | 5/2008 | Juenger | |
| 2008/0198264 A1* | 8/2008 | Balram | G06F 3/14 348/459 |
| 2009/0273710 A1* | 11/2009 | Pearlstein | G06T 3/4007 348/459 |
| 2010/0293402 A1 | 11/2010 | Marinkovic et al. | |
| 2011/0004575 A1 | 1/2011 | Yang et al. | |
| 2011/0115800 A1* | 5/2011 | Desai | H04L 69/04 345/501 |
| 2013/0033605 A1* | 2/2013 | Davies | H04N 7/0125 348/157 |

FOREIGN PATENT DOCUMENTS

| | | |
|---|---|---|
| CN | 1774929 A | 5/2006 |
| WO | 2006-036391 A2 | 4/2006 |

OTHER PUBLICATIONS

International Search Report mailed Aug. 21, 2013 in International Application No. PCT/US2012/060325, 5 pages.

Written Opinion of the International Searching Authority mailed Aug. 21, 2013 in International Application No. PCT/US2012/060325, 5 pages.

International Preliminary Report on Patentability mailed Apr. 21, 2015 in International Application No. PCT/US2012/060325, 6 pages.

Australian Patent Examination Report No. 1 mailed May 29, 2015 in Australian Patent Application No. 2012392518, 3 pages.

* cited by examiner

COMPUTING SYSTEMS AND METHODS FOR CONTROLLING A COMPUTING SYSTEM

TECHNICAL FIELD

Various embodiments generally relate to computing systems and methods for controlling a computing system.

BACKGROUND

Computing systems may have limited energy supply performance. Thus, it may he desirable to keep the energy consumption as low as possible.

SUMMARY OF THE INVENTION

According to various embodiments, a computing system may be provided. The computing system may include: a circuit configured to operate at a plurality of operation frequencies; a graphics output configured to output linage data for display; a rate determiner configured to determine a frame rate of the graphics output; and a frequency setter configured to set an operation frequency of the circuit based on the determined frame rate.

According to various embodiments, a computing system may be provided. The computing system may include: a circuit configured to operate at a plurality of operation frequencies; a storage configured to store a pre-determined frequency value for a pre-determined application; and a frequency setter configured to set the pre-determined frequency as an operation frequency of the circuit if the pre-determined application is executed by the computing system.

According to various embodiments, a computing system may be provided, The computing system may include: a processor configured to operate at a plurality of operation frequencies; a power source configured to provide power to the processor; a power measurement circuit configured to measure the power provided by the power source; and a frequency setter configured to set an operation frequency of the processor based on the measured power.

According to various embodiments, a method for controlling a computing system may be provided. The method may include: controlling a circuit configured to operate at a plurality of operation frequencies; controlling a graphics output configured to output image data for display; determining a frame rate of the graphics output; and setting an operation frequency of the circuit based on the determined frame rate.

According to various embodiments, a method for controlling a computing system may be provided. The method may include: controlling a circuit configured to operate at a plurality of operation frequencies; storing a pre-determined frequency value for a pre-determined application; and setting the pre-determined frequency as an operation frequency of the circuit if the pre-determined application is executed by the computing system.

According to various embodiments, a method for controlling a computing system may be provided. The method may include: controlling a processor configured to operate at a plurality of operation frequencies; controlling a power source configured to provide power to the processor; measuring the power provided by the power source; and setting an operation frequency of the processor based on the measured power.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are: described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now he described by way of examples and not limitations, and with reference to the figures.

The computing system may include a memory which is for example used in the processing carried out by the computing system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored m a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (MC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment. It will be understood that what is described herein as circuits with different names (for example "circuit A" and "circuit B") may also be provided in one physical circuit like described above.

It will be understood that what is referred to as a "computing system" herein may be a desktop computer or a notebook computer or a gaming computer (like a video game console) or any other kind of personal computer or computing device.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also bold for any device described herein. It will be understood that any property described herein for a specific method may also hold for any method described herein. Furthermore, it will be understand that for any device or method described herein, not necessarily all the components or steps described must be enclosed in the device or method, but only some (but not all) components en steps may be enclosed.

Commonly used laptops may have a battery that may have a maximum discharge rate, dependent on the technology used. A Lithium-Ion. Polymer cell may have a maximum continuous discharge rate of 1.5 C (where C is the Capacity of the cell).

Thus, a computer with a Li-Ion cell of 60 Wh capacity (C) may have a maximum continuous discharge of 90 W (1.5 C).

This high current consumption may only be possible when there is a significant load on the computer's CPU (central processing unit), CPU (graphics processing unit) and other components. This may be more common in gaming and graphical applications, where the CPU may be used intensively and the CPU supports all non-graphical functions.

In order to prevent the destruction of the cell, it may be desired to maintain the current to he under this maximum. Conventional computers may measure this current (either directly, or through communication with the smart battery pack) and if a value above the maximum is measured over a short time period, it may reduce the Graphics Processing Unit (CPU) clock frequency through the Embedded Controller (EC) in order to reduce power consumption.

The consequence of this clock speed reduction is the drastic loss of performance of the graphics processing of the computer. If the computer is currently running a graphically intensive app or application (such as a video game), the frames per second (fps) may drop drastically (for example from more than 30 fps to 7-10 fps) depending on the clock speed reduction implemented. This may be a limitation seen in many products on the market today.

According to various embodiments, the GPU may remain at full power, but the power consumption may be reduced elsewhere.

It will be understood that although a circuit for which an operation frequency is reduced is described as a CPU or a CPU, a circuit is not limited to a CPU or a CPU, but may be any other device or sub-device of a computing system, for example a microprocessor or a microcontroller.

Figure 1:
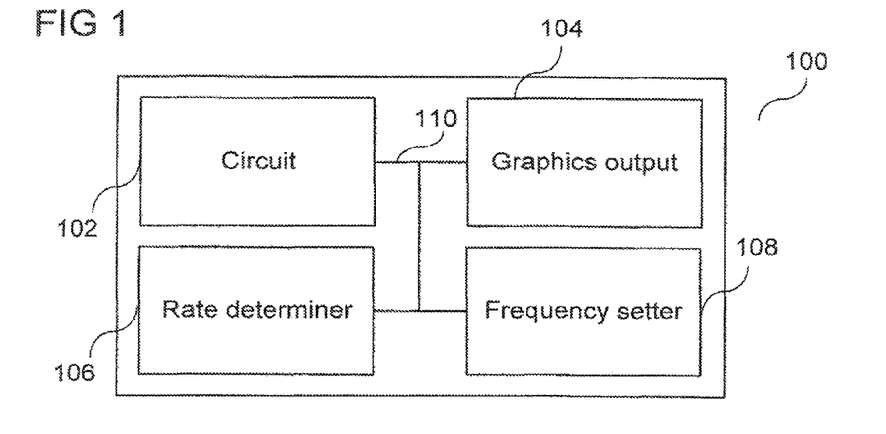
FIG. 1 shows a computing system in accordance with an embodiment.

FIG. 1 shows a computing system 100 in accordance with an embodiment. The computing system 100 may include a circuit 102 configured to operate at a plurality of operation frequencies. The computing system 100 may further include a graphics output 104 configured to output image data for display. The computing system 100 may further include a rate determiner 106 configured to determine a frame rate of the graphics output 104. The computing system 100 may further include a frequency setter 108 configured to set an operation frequency of the circuit 102 based on the determined frame rate. The circuit 102, the graphics output 104, the rate determiner 106, and the frequency setter 108 may be connected via a connection 110 (or a plurality of separate connections), for example an electrical or optical connection, for example any kind of cable or bus.

According to various embodiments, the circuit 102 may include or may be or may be included in a processor.

According to various embodiments, the processor may include or may be or may be included in a central processing unit.

According to various embodiments, the circuit 102 may include or may be o may be included in a graphics processor.

According to various embodiments, the graphics processor may include or may be or may be included in a graphics processing unit.

According to various embodiments, the graphics output 104 may be the output of a graphics card.

According to various embodiments, the graphics card may include the graphics processor.

According to various embodiments, the frequency setter 108 may further be configured to increase the operation frequency of the circuit 102 if the determined frame rate is below a pre-determined first threshold.

According to various embodiments, the frequency setter 108 may further be configured to decrease the operation frequency of the circuit 102 if the determined frame rate is above a pre-determined second threshold.

According to various embodiments the first threshold may he lower than the second threshold.

According to various embodiments, the frequency 108 may further be configured to set an operation frequency of the circuit 102 based on an application executed by the computing system 100.

Figure 2:
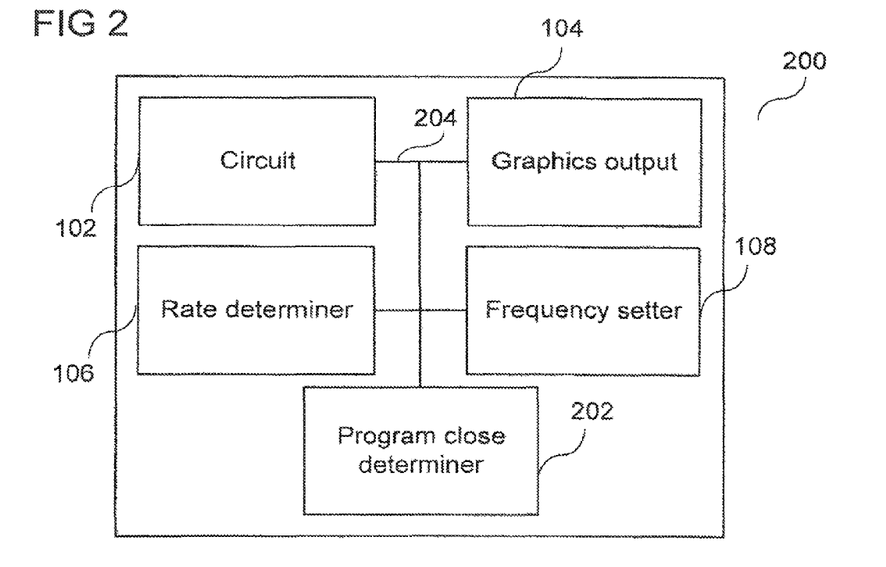
FIG. 2 shows a computing system in accordance with an embodiment.

FIG. 2 shows a computing, system 200 in accordance with an embodiment. The computing system 200 may, similar to the computing system 100 of FIG. 1, include a circuit 102 configured to operate at a plurality of operation frequencies. The computing system 200 may, similar to the computing system 100 of FIG. 1, further include a graphics output 104 configured to output image data for display. The computing system 200 may, similar to the computing system 100 of FIG. 1, further include a rate determiner 106 configured to determine a frame rate of the graphics output 104. The computing system 200 may, similar to the computing system 100 of FIG. 1, further include a frequency setter 108 configured to set an operation frequency of the circuit 102 based on the determined frame rate. The computing system 200 may further include a program close determiner 202, like will be described in more detail below. The circuit 102, the graphics output 104, the rate determiner 106, the frequency setter 108, and the program close determiner 202 may be connected via a connection 204 (or a plurality of separate connections), for example an electrical or optical connection, for example any kind of cable or bus.

According to various embodiments, the program close determiner 202 may be configured to determine from programs presently executed by the computing system 200 a program to be closed.

According to various embodiments, the program close determiner 202 may further be configured to determine the program to be closed so that the determined frame rate fulfils a pre-determined frame-rate criterion.

According to various embodiments, the program close determiner 202 may further be configured to determine the program to be closed so that the operation frequency fulfils a pre-determined frequency criterion.

Figure 3:
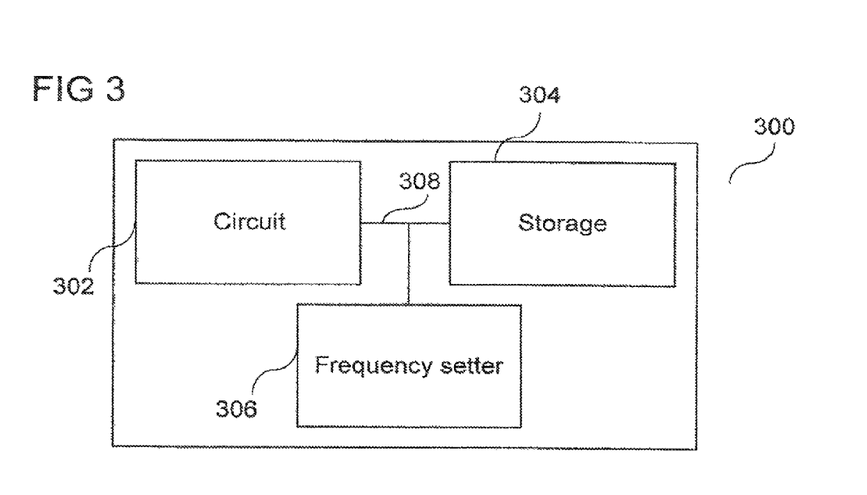
FIG. 3 shows a computing system in accordance with an embodiment.

FIG. 3 shows a computing system 300 in accordance with an embodiment. The computing system 300 may include a circuit 302 configured to operate at a plurality of operation frequencies. The computing system 300 may farther include a storage 304 configured to store a pre-determined frequency value for a pre-determined application. The computing system 300 may further include a frequency setter 306 configured to set the pre-determined frequency as an operation frequency of the circuit 302 if the pre-determined application is executed by the computing system. The circuit 302, the storage 304 and the frequency setter 306 may be connected via a connection 308 (or a plurality of separate connections), for example an electrical or optical connection, for example any kind of cable or bus.

According to various embodiments, the circuit 302 may include or may be or may be included in a processor.

According to various embodiments, the processor may include or may be or may be included in a central processing unit.

According to various embodiments, the circuit 302 may include or may be or may be included in a graphics processor.

According to various embodiments, the graphics processor may include or may be or may be included in a graphics processing unit.

According to various embodiments, the graphics output may be the output of a graphics card.

According to various embodiments, the graphics card may include the graphics processor.

Figure 4:
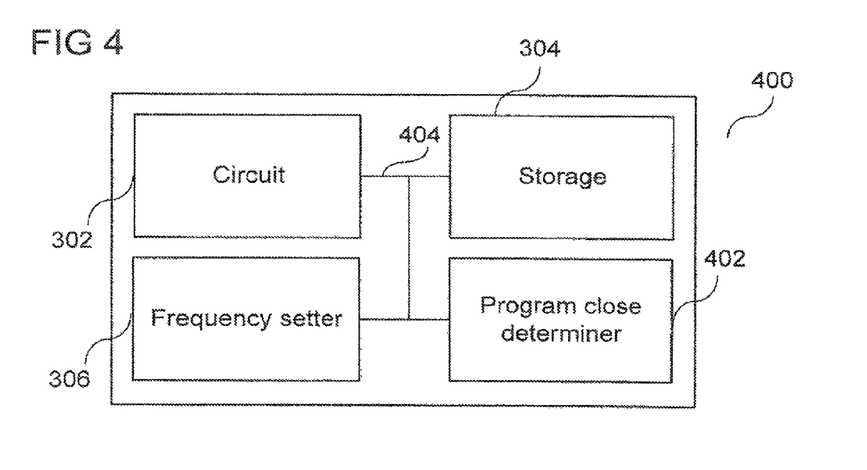
FIG. 4 shows a computing system in accordance with an embodiment.

FIG. 4 shows a computing system 400 in accordance with an embodiment. The computing system 400 may, similar to the computing system 300 of FIG. 3, include a circuit 302 configured to operate at a plurality of operation frequencies. The computing system 400 may similar to the computing system 300 of FIG. 3, Farther include a storage 304 configured to store a pre-determined frequency value for a pre-determined application. The computing system 400 may, similar to the computing system 300 of FIG. 3, further include a frequency setter 306 configured to set the pre-determined frequency as an operation frequency of the circuit 302 if the pre -determined application is executed by the computing system. The computing system 400 may further include a program close determiner 402, like will be described in more detail below. The circuit 302, the storage 304, the frequency setter 306, and the program close determiner 402 may be connected via a connection 404 (or a plurality of separate connections), for example an electrical or optical connection, for example any kind of cable or bus.

According to various embodiments, Inc program close determiner 402 may be configured to determine from programs presently executed by the computing system 400 a program to be closed.

According to various embodiments, the program close determiner 402 may farther be configured to determine the program to he closed so that the operation frequency fulfils a pre-determined frequency criterion.

According to various embodiments, the storage 304 may further be configured to store an application specific frequency value for each of a plurality of applications.

According to various embodiments, the frequency setter 306 may further be configured to set, if more than one application is executed, a frequency based on the more than one application specific frequency values of the more than one application as an operation frequency of the circuit 302.

According to various embodiments, the frequency setter 306 may further be configured to set, if more than one application is executed, a sum of the more than one application specific frequency values of the more than one application as an operation frequency of the circuit 302.

According to various embodiments, the frequency setter 306 may further be configured to set, if more than one application is executed, a maximum value of the more than one application specific frequency values of the more than one application as an operation frequency of the circuit 302.

Figure 5:
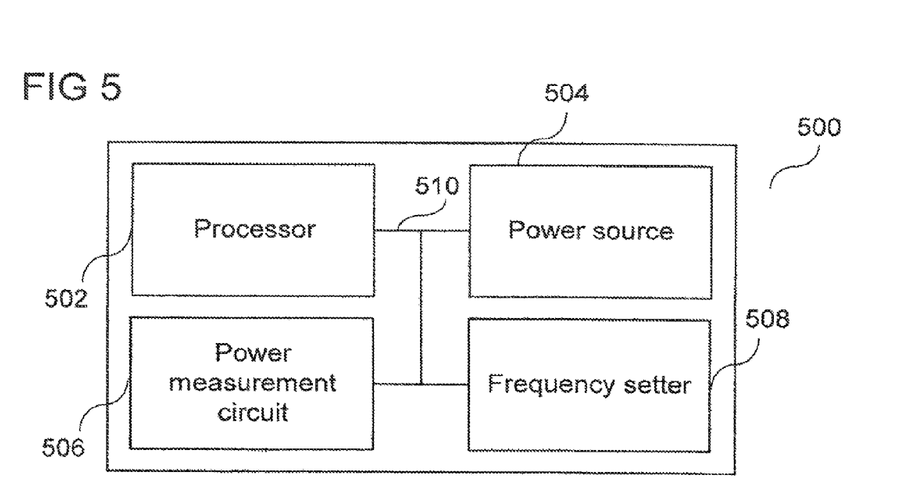
FIG. 5 shows a computing system in accordance with an embodiment.

FIG. 5 shows a computing system 500 in accordance with an embodiment. The computing system 500 may include a processor 502 configured to operate at a plurality of operation frequencies, The computing system 500 may further include a power source 504 configured to provide power to the processor 502. The computing system 500 may further include a power measurement circuit 506 configured to measure the power provided by the power source 504. The computing system 500 may further include a frequency setter 508 configured to set an operation frequency of the processor based on the measured power. The processor 502, the power source 504, the power measurement circuit 506, and the frequency setter 508 may be connected via a connection 510 (or a plurality of separate connections). It example an electrical or optical connection, for example any kind of cable or bus.

According to various embodiments, the processor 502 may include or may be or may be included in a central processing unit.

According to various embodiments, the frequency setter 508 may further be configured to set an operation frequency of the circuit based on an application executed by the computing system 500.

Figure 6:
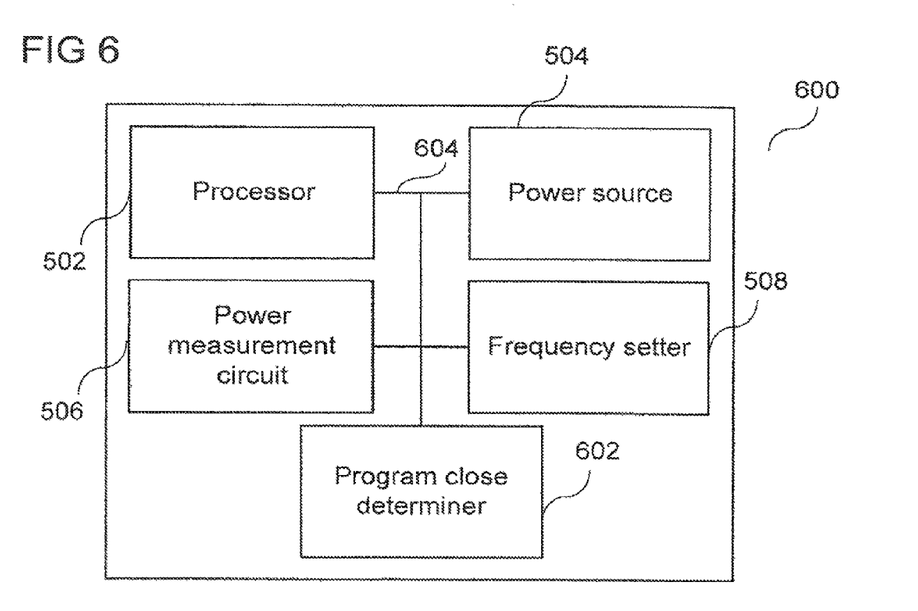
FIG. 6 shows a computing system in accordance with an embodiment.

FIG. 6 shows a computing system 600 in accordance with an embodiment. The computing system 600 may, similar to the computing system 500 of FIG. 5, include a processor 502 configured to operate at a plurality of operation frequencies. The computing system 600 may, similar to the computing system 500 of FIG. 5, further include a power source 504 configured to provide power to the processor 502. The computing system 600 may, similar to the computing system 500 of FIG. 5, further include a power measurement circuit 506 configured to measure the power provided by the power source 504. The computing system 600 may, similar to the computing system 500 of FIG. 5, farther include a frequency setter 508 configured to set an operation frequency of the processor based on the measured power. The computing system 600 may further include a program close determiner 602. The processor 502, the power source 504, the power measurement circuit 506, the frequency setter 508, and the program close determiner 602 may be connected via a connection 604 (or a plurality of separate connections), for example an electrical or optical connection, for example any kind of cable or bus.

According to various embodiments, the program close determiner 602 may be configured to determine from programs presently executed by the computing system 600 a program to be closed.

According to various embodiments, the program close determiner 602 may further be configured to determine the program to be closed so that the measured power fulfils a pre-determined power criterion.

According to various embodiments, the program close determiner 602 may further be configured to determine the program to be closed so that the operation frequency fulfils a pre-determined frequency criterion.

Figure 7:
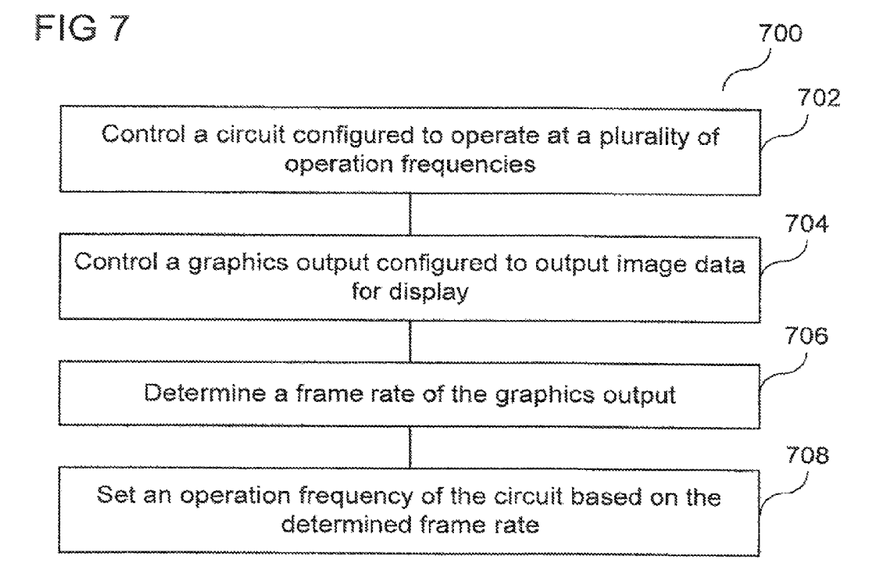
FIG. 7 shows a flow diagram illustrating a method for controlling a computing system in accordance with an embodiment.

FIG. 7 shows a flow diagram 700 illustrating a method for controlling a computing system in accordance with an embodiment. In 702, a circuit configured to operate at a plurality of operation frequencies may he controlled. In 704, a graphics output configured to output image data for display may be controlled. In 706, a frame rate of the graphics output may be determined. In 708, an operation frequency of the circuit may be set based on the determined frame rate.

According to various embodiments, the circuit may include or may be or may be included in a processor.

According to various embodiments, the processor may include or may be or may be included in a central processing unit.

According to various embodiments, the circuit may include or may be or may be included in a graphics processor.

According to various embodiments, the graphics processor may include or may be or may be included in a graphics processing unit.

According to various embodiments, the graphics output may be the output of a graphics card.

According to various embodiments, the graphics card may include the graphics processor.

According to various embodiments, the operation frequency of the circuit may be increased if the determined frame rate is below a pre-determined first threshold.

According to various embodiments, the operation frequency of the circuit may be decreased if the determined frame rate is above a pre-determined second threshold.

According to various embodiments, the first threshold may be lower than the second threshold.

According to various embodiments, an operation frequency of the circuit may be set based on an application executed by the computing system.

According to various embodiments, a program to be closed may be determined from programs presently executed by the computing system.

According to various embodiments, the program to be closed may be determined so that the determined frame rate fulfils a pre-determined frame-rate criterion.

According to various embodiments, the program to be closed may be determined so that the operation frequency fulfils a pre-determined frequency criterion.

Figure 8:
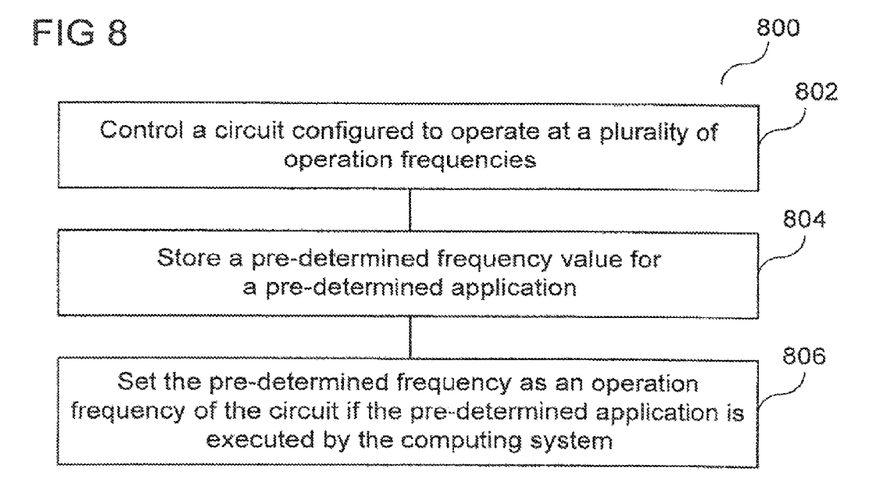
FIG. 8 shows a flow diagram illustrating a method for controlling a computing system in accordance with an embodiment.

FIG. 8 shows a flow diagram 800 illustrating a method for controlling a computing system in accordance with an embodiment. In 802, a circuit configured to operate at a plurality of operation frequencies may be controlled. In 804, a pre-determined frequency value may be stored for a pre-determined application. In 806, the pre-determined frequency may be set as an operation frequency of the circuit if the pre-determined application is executed by the computing system.

According to various embodiments, the circuit may include or may be or may be included in a processor.

According to various embodiments, the processor may include or may be or may be included in a central, processing unit.

According to various embodiments, the circuit may include or may be or may be included in a graphics processor.

According to various embodiments, the graphics processor may include or may be or may be included in a graphics processing unit.

According to various embodiments, the graphics output may be the output of a graphics card.

According to various embodiments, the graphics card may include the graphics processor.

According to various embodiments, a program to be closed may be determined from programs presently executed by the computing system.

According to various embodiments, the program to be closed may be determined so that the operation frequency fulfils a pre-determined frequency criterion.

According to various embodiments, an application specific frequency value may be stored for each of a plurality of applications.

According to various embodiments, if more than one application is executed, a frequency based on the more than one application specific frequency values of the more than one application may be set as an operation frequency of the circuit.

According to various embodiments, if more than one application is executed, a sum of the more than one application specific frequency values of the more than one application may be set as an operation frequency of the circuit.

According to various embodiments, if more than one application is executed, a maximum value of the more than one application specific frequency values of the more than one application may be set as an operation frequency of the circuit.

Figure 9:
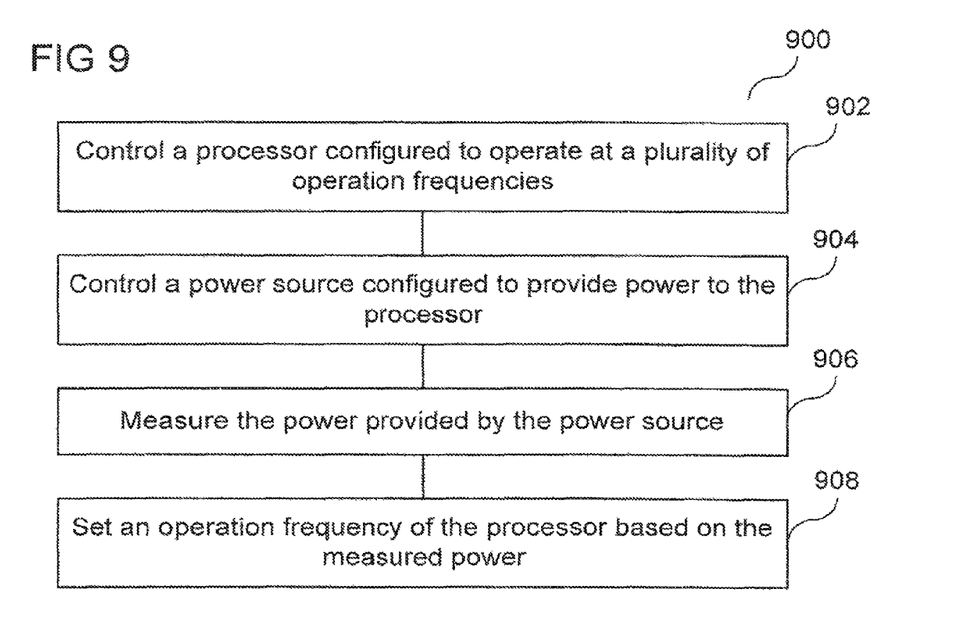
FIG. 9 shows a flow diagram illustrating a method for controlling a computing system in accordance with an embodiment.

FIG. 9 shows a flow diagram 900 illustrating a method for controlling a computing system in accordance with an embodiment. In 902, a processor configured to operate at a plurality of operation frequencies may be controlled. In 904, a power source configured to provide power to the processor may be controlled. In 906, the power provided by the power source may be measured. In 908, an operation frequency of the processor may be set based on the measured power.

According to various embodiments, the processor may include or may be or may be included in a central processing unit.

According to various embodiments, an operation frequency of the circuit may be set based on an application executed by the computing system.

According to various embodiments, a program to be closed may be determined from programs presently executed by the computing system.

According to various embodiments, the program to be closed may be determined so that the measured power fulfils a predetermined power criterion.

According to various embodiments, the program to be closed may be determined so that the operation frequency fulfils a pre-determined frequency criterion.

According to various embodiments, devices and methods may be provided for reducing power consumption of a computer while maintaining performance while running an application.

According to various embodiments, full performance of the system may be retained within a specific application— which may prevent disabling other functionality, such as Wireless LAN (wireless local area network; for example WIFI) cards, dimming video displays and otherwise turning off or reducing functionality of other components that would be noticed by the user.

The load on the CPU may generally he not at a maximum when running a graphically intensive game and the capping of Me maximum allowable frequency of operation may have no impact on gameplay or frames per second. This may be game dependent, and may require either a conservative approach (that may still allow a fairly high clock speed) or a selective approach that may determine the best CPU clock frequency to avoid impacting the user experience.

According to various embodiments, a conservative approach may be to cap the CPU frequency at a point that prevents the maximum power of the CPU from exceeding a set point which allows the GPU and other system components to operate unimpeded and to still maintain a constant discharge rate below the maximum of the battery. This may provide the user with a gaming experience akin to that of the system when on AC (alternating current) power (where the power limits of the battery may not apply).

This "conservative" control mechanism may be implemented by the Embedded controller. First, by measuring battery current with the EC by reading smart battery pack data through SMBus (System Management Bus), or by using an analog to digital converter (ADC) across a low impedance sense resistor, the system may determine whether it is desired to reduce power consumption. Then, the EC may send a command through ACPI (Advanced Configuration and Power Interface) to the CPU, telling it to reduce the maximum frequency of operation to an experimentally pre-determined value.

There may be additional benefit to the user if a more selective approach is used This benefit may be the reduction of power consumption of the system, permitting a longer battery life and longer gameplay for the user. This selective approach may be able to reduce the maximum clock frequency of the CPU intelligently, such that the user experience and FPS may not be affected.

This value may be application dependent, and there may be certain games that may tolerate an extremely low CPU bandwidth and may not have impact on gameplay.

According to various embodiments, at least one of the two "selective" approaches described below may be provided, The first "selective" approach may involve running a program at the application layer of the Operating System (OS) and tracking which game processes are running or which game executables have been started. Based on a library or whitelist, the application may then either inform the EC of the optimal maximum frequency of operation of the CPU, or may otherwise directly reduce the maximum frequency itself.

The second "selective" approach may involve experimentally reducing the CPU frequency and measuring quantitative user experience metrics (such as frames per second).

After reducing the CPU frequency, if a significant FPS reduction is detected, the CPU maximum may be removed or raised. The mechanism to reduce the CPU frequency may be the same as in the first selective approach—either by informing the EC or direct CPU maximum frequency reduction.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A computing system comprising:
a circuit configured to operate at a plurality of operation frequencies; a graphics output configured to output image data for display; a rate determiner configured to determine a frame rate of the graphics output; and
a frequency setter configured to set an operation frequency of the circuit based on the determined frame rate;
wherein the frequency setter is further configured to increase the operation frequency of the circuit if the determined frame rate is below a pre-determined first threshold;
wherein the frequency setter is further configured to decrease the operation frequency of the circuit if the determined frame rate is above a pre-determined second threshold; and
wherein the first threshold is lower than the second threshold.

2. A method for controlling a computing system, the method comprising:
controlling a circuit configured to operate at a plurality of operation frequencies;
controlling a graphics output configured to output image data for display;
determining a frame rate of the graphics output;
setting an operation frequency of the circuit based on the determined frame rate; and
increasing the operation frequency of the circuit if the determined frame rate is below a pre-determined first threshold;
decreasing the operation frequency of the circuit if the determined frame rate is above a pre-determined second threshold;
wherein the first threshold is lower than the second threshold.

* * * * *